United States Patent [19]

Kawazu

[11] 4,049,355
[45] Sept. 20, 1977

[54] PIPE COUPLING

[76] Inventor: Takashi Kawazu, No. 10-4, 5-chome, Nakano-cho, Miyakojima, Osaka, Japan

[21] Appl. No.: 671,001

[22] Filed: Mar. 26, 1976

[30] Foreign Application Priority Data

May 19, 1975 Japan ................................ 50-61404

[51] Int. Cl.² .............................................. F16B 7/00
[52] U.S. Cl. .................................... 403/172; 403/402; 403/295
[58] Field of Search ............... 403/298, 295, 171, 176, 403/172, 279, 170, 174, 295

[56] References Cited

U.S. PATENT DOCUMENTS

| 3,799,685 | 3/1974 | Smith | 403/298 |
|---|---|---|---|
| 3,858,989 | 1/1975 | Field | 403/295 |
| 3,873,220 | 3/1975 | Kashiwabara | 403/295 |
| 3,932,046 | 1/1976 | Kawazu | 403/295 |

FOREIGN PATENT DOCUMENTS

| 1,073,078 | 3/1954 | France | 403/171 |
|---|---|---|---|
| 1,188,571 | 3/1959 | France | 182/178 |
| 1,031,787 | 6/1966 | United Kingdom | 182/178 |

Primary Examiner—Andrew V. Kundrat
Attorney, Agent, or Firm—George B. Oujevolk

[57] ABSTRACT

A pipe coupling includes a base portion and a plurality of insertion legs integrally extending from the base portion. Each of the insertion legs has the free end rounded and equally spaced longitudinal ridges so as to effect four side friction fits in the inner periphery of a pipe to be connected. At least one of the ridges is given an elasticity by opposing slots longitudinally provided below the ridge and has a round projection at the outer end portion and an upward slant extending towards the inner end. The extremity of the slant defines a sharp point for preventing the removal of the insertion leg out of the pipe.

2 Claims, 5 Drawing Figures

PIPE COUPLING

The present invention relates to a pipe coupling for use in display shelves and other various kinds of structures made by pipes.

The pipe connecting device of this kind is disclosed in U.S. Pat. No. 3,932,046 of the same inventor. However, according to this prior art device, since a plate-like inserting member is inserted in a pipe, the connection is effected by the friction or press fits of the opposite side edges of the plate-like element. Though this two side support may effectively hold the position of a long pipe in the direction of width of the inserting element, a strong support cannot be effected in the direction of thickness of the inserting element, thus often causing the rattle of the pipe in that direction. In the worst case, the inserting element may be broken at the connecting portion.

An object of the present invention is to obviate the above defects, and to provide a pipe coupling making it possible to securely hold a pipe without the rattle in any direction and having a sufficient strength at the connecting portion.

Other objects and features of the invention will be apparent from the following description of the invention with reference to the accompanying drawings, in which.

Throughout the drawings, similar parts and elements are shown by the similar reference numerals.

Figure 1:
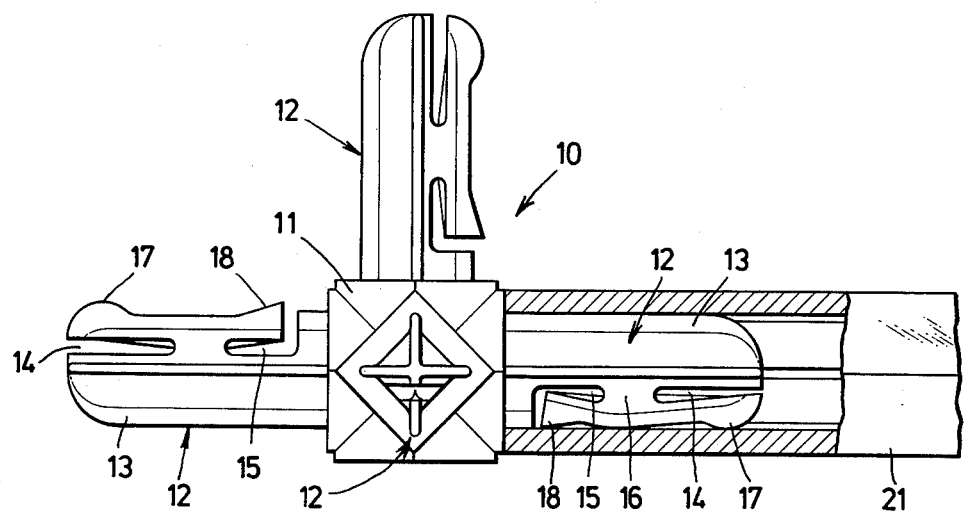
FIG. 1 is a plan view, partially broken, showing the pipe coupling of the invention.
Figure 2:
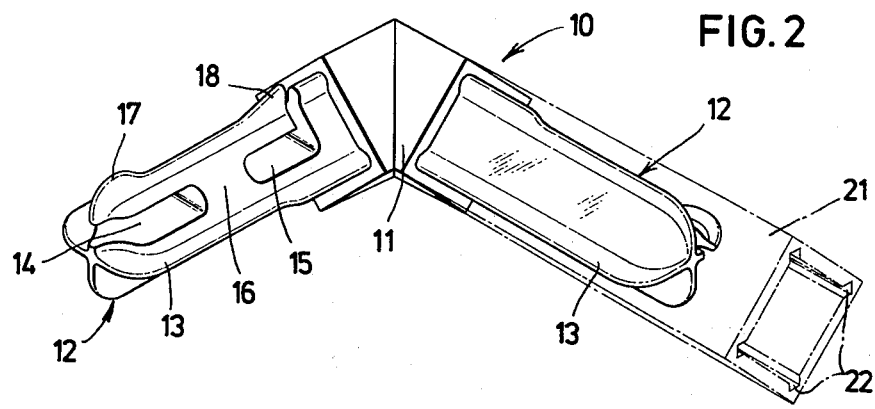
FIG. 2 is a perspective view of the pipe coupling showing a slight modification of FIG. 1.

Referring now to FIGS. 1 and 2, the pipe coupling of the invention generally indicated at 10 comprises a base portion 11 and a plurality of insertion legs 12 integrally extending from the base portion. The pipe coupling 10 is preferably made of synthetic resin by means as of injection mold.

Each of said insertion legs 12 is substantially of square pillar shape with the free end rounded. Along each corner of the square pillar extends a longitudinal ridge 13 serving as a contact face against the inner periphery of a pipe to be connected. Just below one of said ridges 13 are longitudinally provided opposing slots 14 and 15 defined by a web portion 16 so as to give more elasticity to both end portions of the ridge. Similar slots may be provided below other ridges. The ridge above said slots 14 and 15 has a round projection 17 adjacent the outer end and an upward slant 18 extending towards the inner end. The extremity of the slant 18 forms a sharp point serving to bite or catch the inner periphery of a pipe to prevent the disengagement of the insertion leg out of the pipe connected thereto.

Each of said insertion legs 12 may be of substantially bullet-like shape along the surface of which are provided longitudinal ridges 13 at equal spaces to one another joining together at the free end of the leg. Below one of the ridges 13 is also provided the slots 14 and 15.

Figure 3:
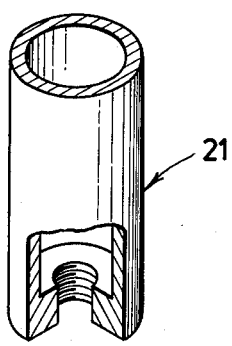
FIG. 3 is a perspective view, broken in part, showing another embodiment of the pipe coupling of the invention.

As shown in FIG. 3, a hole 19 may be provided in the base portion 11 for the insertion of a bolt 20 to be threaded in a pipe 21. The opposite end of the bolt 20 is also threaded in another pipe, whereby the base portion 11 is securely supported between the ends of two pipes. The hole 19 may be filled with synthetic resin after insertion of the bolt 20 so as to secure it to the base portion 11, or the pipe coupling 10 may be molded together with the bolt 20.

Figure 4:
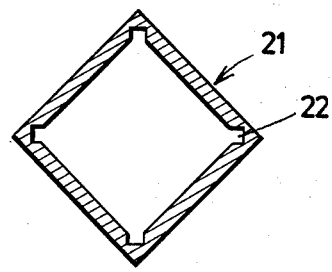
FIGS. 4 and 5 are sectional views of pipes to be connected by the pipe coupling of the invention.
Figure 5:
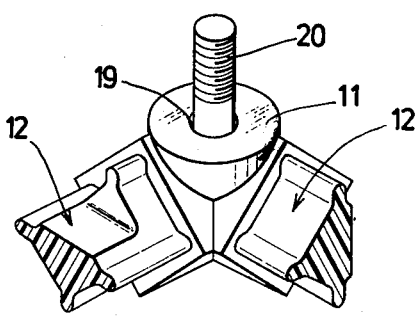

The sectional shape of the pipe 21 to be connected by the coupling 10 of the invention may be square, round or of any other shape. Preferably in the inner periphery of the pipe 21 are provided grooves 22 at equal spaces corresponding to those of the ridges 13 of the coupling 10, as shown in FIGS. 4 and 5.

The number of the insertion legs 12 of the coupling can be selected as desired, so can be the angles of the insertion legs 12 relative to one another.

When connecting the pipe 21 to the coupling 10, one of the insertion legs 12 thereof is inserted in the pipe in such a manner that the ridges 13 slide along the grooves 22 of the pipe 21. Initial and further insertion can be smoothly done since the free end of the insertion leg is rounded. During the insertion, since the ridge 13 having the projection 17 and the slant 18 is given an elasticity by the slots 14 and 15, the ridge acts to urge the opposite ridge against the corresponding groove 22 in the inner periphery of the pipe 21 to effect friction or press fits, as best seen from FIG. 1. Further the sharp point at the inner extremity of the slant 18 prevents the removal of the insertion leg 12 out of the pipe since the sharp point bites or catches the inner periphery of the pipe upon pulling the insertion leg.

Moreover since the insertion leg 12 has hour ridges 13 equally spaced from each other in friction fits in the grooves 22 of the pipe 21, the arrangement enables the secure and balancing support of the pipe and prevents the rattle of the pipe in any direction. Further the insertion legs 12 have sufficient strength for supporting the pipe since they are formed into pillar-like shape.

Though not shown in the drawings, current conductive elements can be attached to the insertion leg so as to be connected to the corresponding elements provided about the inner periphery of the pipe, whereby when the insertion leg 12 is inserted in the pipe, electrical circuits can be connected with each other.

When the face of the base portion 11 abutting the end of the pipe is formed into the same diameter and shape as those of the pipe, the end of the pipe can be closed without leaving any clearance or space, thus providing better appearance of the structure made by the pipes.

As described above, according to the present invention, the pipes can be readily and securely assembled into a structure such as a dsiplay shelf.

Further since the pipe coupling of the invention is integrally made of synthetic resin by means as of injection molding, it can be readily produced and is suitable for a mass-production, thereby making it possible to obtain a pipe coupling having a lower cost, better appearance and lighter weight.

I claim:

1. A pipe coupling comprising:
   a. a base portion having faces equal in diameter to the pipe (11);
   b. a plurality of insertion legs with a free end rounded, each of said insertion legs (12) being integral with and extending outwards from the base portion;
   c. equally spaced integral ridges (13) longitudinally extending on said legs so as to provide a friction fit in the inner perphery of a pipe to be connected, at least one of the ridges being given an elasticity by means of opposing slots (14, 15) longitudinally provided below the ridge and defined by a web portion (16) supporting the ridge on the leg, said slots giving elasticity to the end portions of the ridge;

d. a round outer projection (17) on said ridge adjacent the outwards end portion and an outer upward slant (18) extending towards the inner end of said ridge, the extremity of the slant defining a sharp point for preventing the removal of the insertion leg out of a pipe and wherein a bolt insertion hole is provided in the base portion.

2. A pipe coupling as claimed in claim 1, wherein the face of the base portion abutting the end of the pipe has the same diameter and shape as those of the pipe.

* * * * *